(No Model.)
C. TAHASH.
THILL COUPLING.
No. 454,236. Patented June 16, 1891.
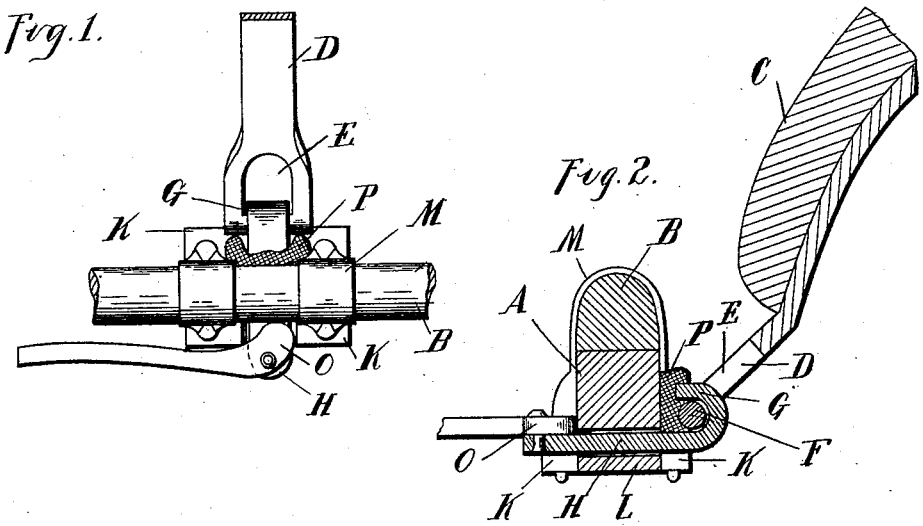
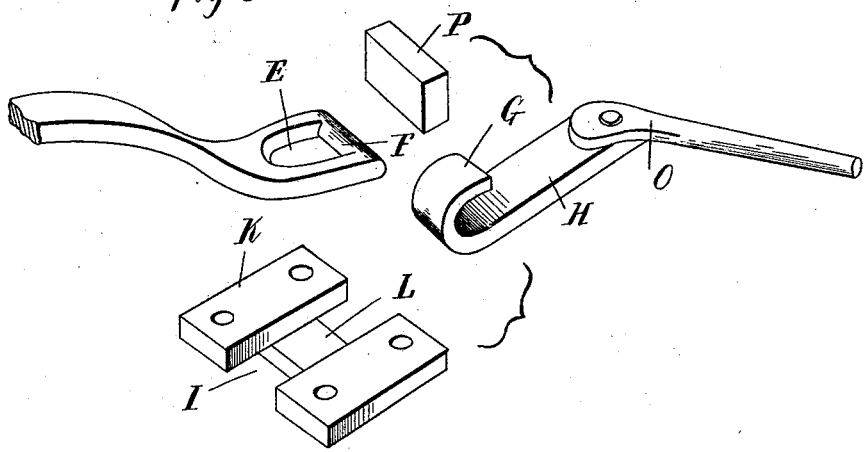
Witnesses
A. L. Hobbs
P. M. Hulbert
Inventor
Charles Tahash
By Thos. S. Sprague & Son,
Att'y.

UNITED STATES PATENT OFFICE.

CHARLES TAHASH, OF PLYMOUTH, MICHIGAN, ASSIGNOR OF ONE-HALF TO CHARLES BREMS, OF SAME PLACE.

THILL-COUPLING.

SPECIFICATION forming part of Letters Patent No. 454,236, dated June 16, 1891.

Application filed November 13, 1890. Serial No. 371,364. (No model.)

*To all whom it may concern:*

Be it known that I, CHARLES TAHASH, a citizen of the United States, residing at Plymouth, in the county of Wayne and State of Michigan, have invented certain new and useful Improvements in Thill-Supports and Anti-Rattlers, of which the following is a specification, reference being had therein to the accompanying drawings.

This invention relates to new and useful improvements in a shaft-coupling and anti-rattler combined; and the invention consists in the peculiar construction of a coupling consisting of a clip designed to be secured upon the axle, a transverse bearing in said clip below the axle, a sliding plate in said bearing, a hook at the forward end of said plate extending upwardly and adapted to be moved to and from the axle, a clamping device secured to the rear end of the plate, and a rubber cushion clamped between the hook and the axle, and, further, in the peculiar construction, arrangement, and combination of the various parts, all as more fully hereinafter described.

In the drawings, Figure 1 is a plan view of my improved device as attached to the front axle of a vehicle. Fig. 2 is a vertical central longitudinal section thereof. Fig. 3 is a detached perspective view of the parts composing the coupler.

A is the axle. B is the axle-cap. C is the shaft, and D is the shaft-iron.

The shaft-iron is provided at its rear end with a socket E, having the cross-bar F, forming the rear side thereof. This cross-bar is preferably round, and is adapted to engage with the hook G of the sliding plate H, which engages in the guide $i$, formed between the two clip-plates K on the under side of the axle. These clip-plates are preferably connected by a connecting-bar L, which forms the lower side of the bearing.

M are two clips surrounding the axle and cap and secured at their lower ends to the clip-plates K.

The plate H is of such length that the hook G extends in front of the axle, while the rear end of the plate extends in the rear thereof, and is provided with any suitable means for giving a lateral movement to the plate, whereby the hooked portion may be drawn toward and moved from the axle.

I have shown in the drawings a cam-lever O, pivoted to the rear end of the plate as the means for moving the same, the lever being so constructed that in the position shown in Fig. 1 it is automatically locked.

P is a rubber cushion adapted to be secured between the hook and the axle and to be clamped in position by moving the hook backward and locking it in its backward position by means of the cam, as shown in Fig. 1.

The parts being thus constructed, their operation is as follows: In order to engage the shaft-iron with the coupling, the cam-lever O is unlocked, which allows of moving the plate H to its forward position, with the end of the hook free from the axle. The rubber cushion P may be removed and the bar F of the shaft-iron engaged with a hook, as plainly shown in Figs. 1 and 2. The rubber cushion being now placed upon the plate in the rear of the hook, it will be firmly clamped between the hook and the axle by turning the cam-lever to its locked position, and at the same time the cushion will bear tightly against the rear side of the shaft-iron and prevent its rattling.

While I have shown the cam-lever as the means for locking the plate in position, it is evident that a screw or other similar device may be used in place thereof.

What I claim as my invention is—

The combination, with a shaft and axle, of a shaft-coupling and anti-rattler comprising a clip, a transverse guide-bearing in the base of said clip, formed of two clip-plates and a connecting-bar, a plate slidingly secured in said guide-bearing, a hook at the forward end of said plate extending upwardly, a cushion upon said plate in the rear of the hook and adapted to be clamped by the hook against the axle, and a clamping device consisting of a cam-lever secured to the rear of the plate, substantially as described.

In testimony whereof I affix my signature in presence of two witnesses.

CHARLES TAHASH.

Witnesses:
W. T. MARKHAM,
GEO. A. STARKWEATHER.